Jan. 1, 1952      W. J. DARMODY      2,580,412

NONDEFORMING HOLDING MEANS FOR GAUGES

Filed July 13, 1946

INVENTOR.
WILLIAM J. DARMODY.
BY
J. H. Church & H. E. Thibodeau
ATTORNEYS

Patented Jan. 1, 1952

2,580,412

UNITED STATES PATENT OFFICE 2,580,412

NONDEFORMING HOLDING MEANS FOR GAUGES

William J. Darmody, Philadelphia, Pa., assignor to the United States of America as represented by the Secretary of War Application July 13, 1946, Serial No. 683,379

10 Claims. (Cl. 33—178)

(Granted under the act of March 3, 1883, as amended April 30, 1928; 370 O. G. 757)

The invention described herein may be manufactured and used by or for the Government for governmental purposes, without the payment to me of any royalty thereon.

This invention relates to gages and more particularly to gages in which the gaging member is an integral unit in the form of a solid ring or plug having a polished or finished surface forming the gaging section and adapted to contact the surface of the work piece whose dimension is to be measured.

Among the objects of this invention is the provision of a gage having a handle or gage body, a gaging member supported in said handle or gage body, and a spacer, such as a ring, of resilient rubberlike material located between the handle or gage body and the gage member thus holding these parts in spaced relatively rigid relation.

Another object of this invention is the provision of a resilient element between the gage holder and the gage element which resilient element permits the gage holder to support the gage element without deforming it.

An additional object of this invention is to provide a gage in which the gage handle or support and the gaging member or gaging section may be made of materials having different coefficients of expansion because the use of a resilient material between the support and the gaging member absorbs any variations in the expansion or contraction of these two parts.

A further object of this invention is the provision of a gage in which the resilient spacer allows the gaging member or gaging section to be readily applied to or removed from the gage body or handle so that the gaging member or gaging section can be replaced in case of wear, or so that gaging members or gaging sections of various sizes may be used in the same handle or gage body.

A still further object of this invention is the provision of a gage which is inexpensive to manufacture and convenient and accurate to use.

It is another object of this invention to provide a gage in which there is interposed between the gage body or handle and the gaging member or gaging section a spacer of heat insulating material (for example, the ring of rubberlike material already mentioned) so that temperature changes, such as the heat of the hand, applied to the gage body or handle are not transmitted to the gaging member or gaging section.

Other objects of this invention will be readily apparent to those skilled in the art of measuring to which this invention pertains or such other objects will become apparent from the annexed drawings and specification to which reference is here made for an exposition of some forms which the present invention may take.

Figure 1:
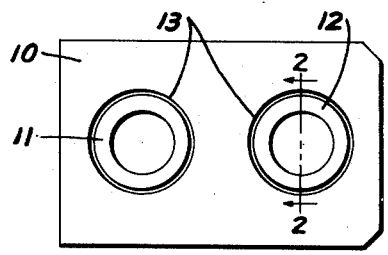
Fig. 1 is a face or plan view of a twin ring gage.
Figure 2:
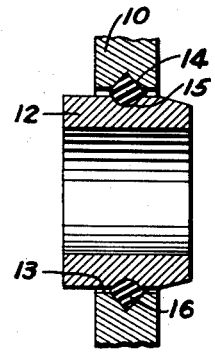
Fig. 2 is a cross section on line 2—2 of Fig. 1 on an enlarged scale.

Figs. 1 and 2 show a twin ring gage formed of a gage body or handle 10 formed of a plate or sheet of relatively soft, inexpensive metal. In handle 10 are mounted or supported the gaging sections or gaging members in the shape of rings or bushings. For example, ring 11 may be the "go" bushing and ring 12 the "no go" bushing. These ring gage bushings 11 and 12 may be made of hardened tool steel or other wear resistant material such as tungsten carbide or synthetic jewels. Holder 10 has two cylindrical openings 13 through it in which the ring gage bushings 11 and 12 are mounted so as to be spaced from the walls of the opening 13. Holder 10 also has in each of its cylindrical surfaces, which form the openings 13, a notch or groove 14 of wedge or triangular shape in transverse cross section, as seen in Fig. 2.

The ring gage bushings 11 and 12 likewise each has in its outer cylindrical surface, confronting groove 14, a groove 15 which is curved or of half-circle shape in transverse cross section, as seen in Fig. 2.

A spacer, in the shape of a ring 16 of resilient material, such as rubber, is located in the grooves 14 and 15. The relatively flat shape of the walls of groove 14 enables groove 14 to hold the ring 16 firmly in place, while the relatively curved or rounded shape of the wall of groove 15 enables the ring 16 to snap or expand into and out of the groove 15. This promotes the insertion to or the removal of the gage bushings 11 or 12 from the handle or gage holder 10.

Figure 2A:
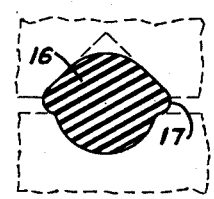
Fig. 2A is a phantom view in transverse cross section through the spacing ring with parts of the gage handle and of the gaging member shown by dotted lines.

Ring 16 is of normally circular or disk shape in transverse or radial cross section but is of such a size that it is deformed or compressed by the grooves 14 and 15 so that it takes the shape of the walls of these grooves or of portions of the walls of these grooves and is further deformed or extruded into the space between the holder 10 and the outer surface of the ring gage bushings 11 or 12 so that it forms a small knob or protuberance as indicated at 17 in Fig. 2A.

Ring 16 is made of a material of sufficient resilience or flexibility so that it holds the ring gage bushings 11 and 12 in the holder 10 without appreciable wobble or looseness. Ring 16 does not conduct heat, so that the heat of the holder 10 from the hand of the user or from any other source, is not transmitted to the ring gage bushings 11 and 12. Therefore, the size of these ring gage bushings (and consequently their accuracy) is not disturbed.

Figure 3:
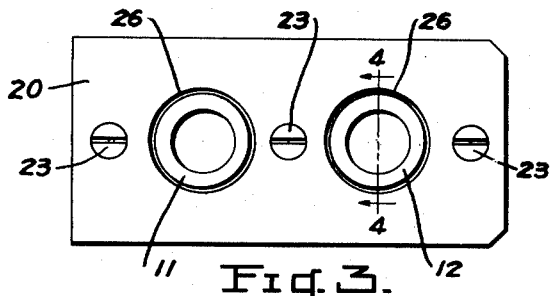
Fig. 3 is a face or plan view of a twin ring gage in which the blank or gage body is formed of two plates.
Figure 4:
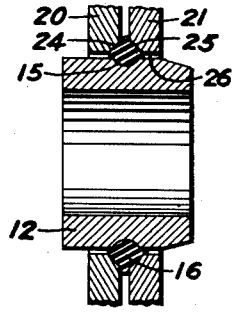
Fig. 4 is a cross section on line 4—4 of Fig. 3 on an enlarged scale.

Figs. 3 and 4 show a modified form of a twin ring gage in which the holder or gage body is formed of two plates 20 and 21 which are spaced apart in side-by-side position. Plates 20 and 21 are held juxtaposed or confronting one another by screws 23. Plate 20 has one corner cut away or beveled by a circular countersink 24, and plate 21 has one corner cut away or beveled by a circular countersink 25, so that the spaces between the inner walls of plates 20 and 21, adjacent the openings 26 through these plates, are of substantially triangular or wedge shape in transverse cross section.

Ring gage bushings 11 and 12 are mounted in the holder or gage body formed by plates 20 and 21 by means of a ring 16 of resilient non-heat-conducting material. Ring 16 may be compressed or deformed to protrude between plates 20 and 21 also between plates 20—21 and ring gage bushings 11—12, a greater or less extent by tightening up the screws 23 to a varying degree.

Figure 4A:
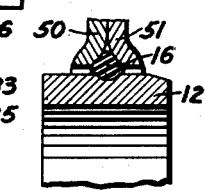
Fig. 4A is a transverse cross section similar to Fig. 4 but showing a modification.

Fig. 4A shows a modification in which the handle or holder is formed of perforated plates having the portions 50 and 51, which surround the holes through these plates, embossed out of the plane of the remainder of these plates so as to form means for retaining the ring 16 between the holder or handle (comprised by these plates) and the ring gage bushings, of which the "no go" bushing 12 is shown in Fig. 4A.

Figure 5:
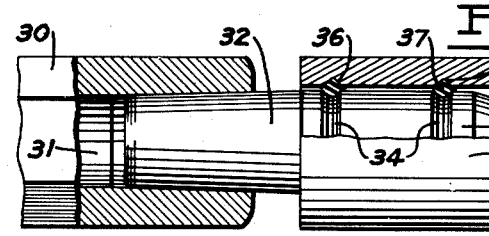
Fig. 5 is a view of a side or elevation of an annular plug gage with parts of the handle and of the ring shaped gaging member cut away in longitudinal cross section.

Fig. 5 shows an annular plug gage made up of a handle 30 having at one end of it a recess or cavity 31 into which fits a tapered extension 32 of a cylindrical support 33 in whose outer surface are formed two grooves 34 of half round shape in transverse cross section. Surrounding and spaced from cylindrical support 33 is a shell forming the gaging member in the shape of a tube or ring 35 whose outer surface is finished to provide the gaging section. The inner surface of ring 35 has two depressed ring-shaped grooves 36 in it of triangular or wedge shape in transverse cross section which confront the grooves 34 in the outer surface of the support 33.

A pair of rings 37 of resilient non-heat-conducting material hold gage member 35 spaced from but relatively firmly located with relation to support 33. Rings 37 are normally of circular or disk shape in cross section but are of such a size and such a flexible composition that they are deformed and take the shape of the walls of the grooves 34 and 36. The rings 37 bulge or extend slightly into the space between the support 33 and the gage member 35 where the walls of the rings 37 are not confined by the walls of the grooves 34 or 36.

Figure 6:
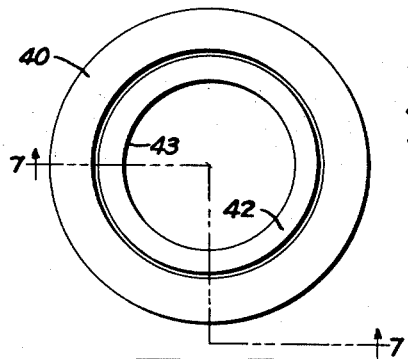
Fig. 6 is a top or plan view of a plain ring gage.
Figure 7:
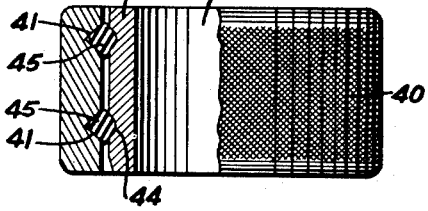
Fig. 7 is a view partially in cross section on line 7—7 of Fig. 6 and partially in side elevation.

Figs. 6 and 7 show a plain ring gage in which the gage body or handle 40 is in the shape of a tube or ring having in its inner surface two grooves 41 of triangular or V-shape in transverse cross section. Within the holder 40 is located the gaging member or ring 42 whose inner cylindrical surface 43 is finished to form the gaging section. The outer cylindrical surface of the tubular ring-shaped gaging member 42 has two grooves 44 in it of semicircular or curved shape in transverse cross section. Rings 45, which are normally circular in transverse cross section and which are of a flexible, resilient, compressible material resistant to the transmission of heat, are located in the grooves 41 and 44 between the holder 40 and the gaging member 42. Rings 45 assume the shape of the walls of the grooves 41 and 44 with which they are in engagement or of parts of these walls, but between the holder 40 and the gaging member 42, the walls of the rings 45 bulge or protrude, so that the rings 45 swell out and occupy a portion of the space between the inner surface of the holder 40 and the outer surface of the gaging member 42.

Rings 45 thus hold the gaging member 42 firmly in the holder 40, but in such a manner that the gaging member 42 can be readily detached from and restored in the holder 40 or replaced in holder 40 by another similar gaging member of slightly different gage size.

The resilient non-heat-conducting spacers 16, 37 or 45 have been shown as being rings of normally circular or disc shape in transverse cross section. But it is to be clearly understood that such spacers may be in the form of a solid layer or of an interrupted or discontinuous ring or of separated plugs. In each case such a spacer or spacers is made of a flexible, resilient material non-conductive of heat.

I claim:

1. A gage including a handle, a gaging member supported by said handle, said handle and said gaging member having opposed surfaces each bearing a mutually confronting groove, and a spacer of resilient non-heat-conducting material lying in said grooves interposed between said handle and said gaging member so as detachably to connect them.

2. A gage including a handle having a cylindrical perforation therein and a ring shaped groove in the wall of said perforation, a gaging member having a ring-shaped groove in its wall confronting the groove in said handle, and a ring of resilient non-heat-conducting material lying in said grooves and holding said gaging member in spaced relation to said handle.

3. In a gage having a handle forming the supporting means for the gage and a gaging member having a surface forming the gaging section for engagement with the surface to be measured, said supporting means and said gaging member having opposed surfaces each bearing a mutually confronting groove, a ring of resilient non-heat-conducting material of normally circular cross section lying in the grooves of said opposed surfaces holding said handle and said gaging member in firm spaced-apart connection.

4. Means for determining the dimensions of a work piece including supporting means providing for the handling of the device, gaging means providing for the measuring of the surface to be measured, said supporting means and said gaging means having opposed surfaces each bearing a mutually confronting groove, and a resilient non-heat-conducting means lying in said opposed grooves interposed between said supporting means and said gaging means and holding them in spaced-apart connection for ready attachment or detachment.

5. A gaging device including a handle forming the support for the device, a gaging member having one surface finished for contact with the work to be measured, opposedly grooved confronting surfaces on said handle and on said gaging member, and a resilient non-heat-conducting element lying compressed in the opposed grooves between said confronting surfaces and expansible so as to hold said handle and said gaging member in spaced-apart confronting position for ready attachment or detachment.

6. A twin ring gage including a flat gage body having perforations therethrough and a ring shaped groove in the wall of each perforation, a "go" ring gage bushing mounted in one of said perforations, a "no go" ring gage bushing mounted in the other said perforation, said "go" and "no go" rings each having a ring shaped groove in its wall confronting the corresponding groove in said gage body, and rings of non-heat-conducting rubberlike material lying in said grooves and interposed between the wall of said perforations and said bushings so as to hold said bushings in spaced juxtaposition in said gage body.

7. An annular plug gage including a cylindrical support, a tubular ring-shaped shell surrounding said support and having its outer surface finished to form a gaging section, said support and said shell having opposed surfaces each bearing a mutually confronting groove, and a ring of non-heat-conducting rubberlike material lying in said opposed grooves interposed between said support and said shell and holding said support and said shell in spaced confronting relation.

8. A plain ring gage including a ring-shaped handle having a ring-shaped groove in its inner wall, a ring-shaped tubular gaging member having its inner cylindrical surface finished to form a gaging section and having a groove therearound confronting the corresponding groove in said handle, and a ring of non-heat-conducting rubberlike material interposed between the inner cylindrical surface of said handle and the outer cylindrical surface of said gaging member and holding said handle and said gaging member in spaced confronting relatively firm relation.

9. A gage holder including a pair of spaced confronting plates, oppositely directed bosses on said plates provided with apertures, a gaging member providing for the measuring of the surface to be measured, said gaging member bearing a groove which opposes a groove formed by said bosses, a spacer of non-heat-conducting resilient material mounted in said opposed grooves interposed between said bosses and said gaging member, and screws holding said plates in spaced-apart relation abutting said spacer.

10. A gage including a handle formed of a pair of flat perforated plates having portions surrounding the perforation embossed out of the plane of the plates, a gaging member supported by a ring in the perforation in said plates so as to be spaced from said plates, said gaging member bearing a groove which opposes a groove formed by the embossed portions of said plates, a resilient non-heat-conducting ring mounted in said opposed grooves interposed between said embossed portions and said gaging member and holding them in spaced-apart connection, and means drawing said plates together to compress a portion of said ring between them.

WILLIAM J. DARMODY.

REFERENCES CITED

The following references are of record in the file of this patent:

UNITED STATES PATENTS

| Number | Name | Date |
| --- | --- | --- |
| 664,995 | Ernst | Jan. 1, 1901 |
| 1,341,771 | Allender | June 1, 1920 |
| 1,913,674 | Kaufmann | June 13, 1933 |
| 2,004,712 | Thiry | June 11, 1935 |
| 2,174,105 | Haury | Sept. 26, 1939 |
| 2,345,750 | Hohwart | Apr. 4, 1944 |
| 2,350,415 | Paulsen | June 6, 1944 |
| 2,382,291 | Carleberg | Aug. 14, 1945 |
| 2,514,956 | Kuebler | July 11, 1950 |

FOREIGN PATENTS

| Number | Country | Date |
| --- | --- | --- |
| 548,215 | Great Britain | Sept. 30, 1942 |